United States Patent Office 2,864,711
Patented Dec. 16, 1958

---

2,864,711

GLAZED CERAMIC BODIES AND METHODS FOR PRODUCING SAME

Joseph Boyce, Beaver Falls, and Karl Kautz, Pittsburgh, Pa., assignors to Vitro Corporation of America, Verona, N. J.

No Drawing. Application May 20, 1954
Serial No. 431,276

5 Claims. (Cl. 106—39)

Our invention relates to glazed ceramic bodies and methods for producing same.

Glazed ceramic bodies are conventionally produced either by applying a suitable glaze composition to the surface of a prefired body and subsequently refiring the body to mature the glaze, or, in certain cases, by applying the glaze composition to a preformed but unfired body and subsequently heating the body to a temperature sufficient to fire the body and mature the glaze simultaneously.

Therefore, each process involves the discrete step of applying a glaze composition to the surface of a ceramic body. This step is both costly and time consuming, and accordingly, many attempts have been made to eliminate this step by producing a self-glazing ceramic body. As far as is known to us, such attempts have proved unsuccessful.

Accordingly, it is an object of the present invention to provide novel self-glazing ceramic bodies.

Another object is to provide novel processes for producing self-glazing ceramic bodies.

A further object is to provide novel self-glazing ceramic bodies which incorporate a finely divided, premelted, glass-like flux and zircon.

Still another object is to provide a novel process for producing self-glazing ceramic bodies at low firing temperatures and with short firing cycle periods.

In our copending application Serial No. 431,275, filed May 20, 1954, we disclosed processes for firing dry pressed, extruded, jiggered, or cast ceramic bodies at firing temperature falling within the range from 1000° to 1600° F. and with firing cycle periods falling within the range from 5 to 120 minutes. The composition of these bodies includes between 5% and 70% by weight of a premelted, finely divided, glass-like flux having a melting temperature which falls below the firing temperature and which is selected from the class composed of lead-bearing, zinc-bearing and alkali-alkaline earth-bearing silicates, boro-silicates, and fluo-borosilicates. This composition further includes between 95% and 30% by weight of certain known ceramic-forming inorganic compounds, such as minerals of the oxide or silicate type, or processed compounds, such as metal oxides, silicates, phosphates, sulphates, titanates and the like, which have melting temperatures which exceed the firing temperature. The above proportions can be suitably varied within these ranges to enable the addition if necessary, of plasticizers, such as bentonite, in proportions up to 10% by weight.

We have discovered that when between 30% and 70% by weight of this premelted, finely divided, glass-like flux is mixed with between 70% and 30% by weight of zircon, and this mixture is preformed into a body of desired shape and fired in the manner previously indicated, a glazed vitreous body is produced.

There is one striking difference between zircon and the conventional compounds referred to previously. When a conventional ceramic composition is fired, the refractory compound usually dissolves to some extent in the molten glass phase and the composition of the mixture becomes more refractory; under these conditions no self-glazing action can take place at the firing temperatures indicated. When our ceramic composition is used, zircon is either insoluble or at best sparingly soluble in the molten glass phase, and the composition does not become more refractory. Under these conditions, the self-glazing action takes place when the composition is fired.

The following example sets forth an application of this invention. It is, however, not to be considered as a limitation thereof, since many modifications can be made without departing from the spirit and scope of this invention.

*Example*

An alkali-alkaline earth-zinc oxide fluo-borosilicate type flux having the following composition:

| Material: | Percent by weight |
|---|---|
| Sodium oxide | 4.84 |
| Potassium oxide | 7.20 |
| Zinc oxide | 9.03 |
| Boron oxide | 1.54 |
| Aluminum oxide | 8.55 |
| Silicon dioxide | 61.22 |
| Calcium fluoride | 7.62 | was premelted to a glass, fritted, and ground to an average particle size about 3 microns.

A ceramic composition containing 50% by weight of this flux, 25% by weight of feldspar and 25% by weight of zircon was prepared. This composition was thoroughly mixed with 10% by weight of water being added during the mixing operation. The resulting mixture was formed in a 4 inch by 4 inch mold, and compressed at a pressure of 500 p. s. i., to produce a preformed tile having the dimensions 4 inches by 4 inches by ⅛ inch. This tile was then dried and fired in a conveyor belt furnace to a temperature of 1300° F. until the entire tile attained this temperature. The tile was allowed to cool in the furnace until the tile attained a temperature of about 500° F., at which point the tile was removed from the conveyor belt. The tile was held at peak temperature for about 15 minutes.

A white vitreous tile of excellent commercial quality was produced. By adding from ¼% to 5% ceramic color pigments to the above composition and thoroughly mixing by wet milling or by micro-pulverizing, various colored vitreous floor tiles were produced.

Preformed tiles of this type were fired as before at temperatures within the range from 1400° to 1450° F. At these increased firing temperatures, self-glazed, vitreous, glossy tiles were produced which needed no further glazing operation. The color uniformity remained constant over the entire temperature range from 1400° to 1500° F. There was no absorption in the body. The body was resistant to ink or dye penetration.

None of the common glaze defects, such as crawling, tearing, crazing, shivering, color variation, and the like, was found present in the tiles produced in this manner.

While we have described and pointed out and illustrated the invention as applied to the above example, many variations within the purview of this invention will be apparent to those skilled in the art and it is our intention not to be limited except as in the claims which follow.

We claim:

1. A self-glazing ceramic powder having a firing temperature within the range from 1000 to 1600° F. consisting essentially of from about 30% to about 70% by weight of a premelted, finely divided, glass-like flux consisting of about 5% sodium oxide, about 7% potassium oxide, about 9% zinc oxide, about 1.5% boron oxide, about 8.5% aluminum oxide, about 61% silicon dioxide, and about 7.5% calcium fluoride, the said flux having a melting temperature below the firing temperature, and between about 70% and about 30% by weight of zircon.

2. A self-glazing ceramic powder having a firing temperature within the range from 1000 to 1600° F. consisting essentially of about 50% by weight of a premelted, finely divided, glass-like flux consisting of about 5% sodium oxide, about 7% potassium oxide, about 9% zinc oxide, about 1.5% boron oxide, about 8.5% aluminum oxide, about 61% silicon dioxide and about 7.5% calcium fluoride, the said flux having a melting temperature below the firing temperature, and about 25% feldspar and about 25% zircon.

3. A self-glazing ceramic power in accordance with claim 1 including ceramic color pigments in an amount within the range from 0.25 to 5% by weight.

4. A process for producing a self-glazed ceramic body which includes the steps of preforming a structure consisting essentially of a ceramic powder having a firing temperature within the range from 1000 to 1600° F. consisting essentially of from about 30% to about 70% by weight of a premelted, finely divided, glass-like flux consisting of about 5% sodium oxide, about 7% potassium oxide, about 9% zinc oxide, about 1.5% boron oxide, about 8.5% aluminum oxide, about 61% silicon dioxide, and about 7.5% calcium fluoride, the said flux having a melting temperature below the firing temperature, and between about 70% and about 30% by weight of zircon, and firing said structure at a temperature within the range from about 1000 to about 1600° F. said temperature being above the melting temperature of the flux and below the melting temperature of zircon until a vitreous self-glazed ceramic body is produced.

5. A process for producing a self-glazed ceramic body which includes the steps of preforming a structure consisting essentially of a ceramic powder having a firing temperature within the range from 1000 to 1600° F. consisting essentially of about 50% by weight of a premelted, finely divided, glass-like flux consisting of about 5% sodium oxide, about 7% potassium oxide, about 9% zinc oxide, about 1.5% boron oxide, about 8.5% aluminum oxide, about 61% silicon dioxide and about 7.5% calcium fluoride, the said flux having a melting temperature below the firing temperature, and about 25% feldspar and about 25% zircon, and firing said structure at a temperature within the range from about 1000 to about 1600° F., said temperature being above the melting temperature of the flux and below the melting temperature of the zircon, until a vitreous self-glazed ceramic body is produced.

References Cited in the file of this patent
UNITED STATES PATENTS 2,018,600    Brown _____ Oct. 22, 1935